(12) United States Patent
Naganawa

(10) Patent No.: US 8,081,166 B2
(45) Date of Patent: Dec. 20, 2011

(54) INFORMATION PROCESSING APPARATUS AND METHOD OF CONTROLLING SAME

(75) Inventor: Yoshihiro Naganawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 712 days.

(21) Appl. No.: 11/850,281

(22) Filed: Sep. 5, 2007

(65) Prior Publication Data

US 2008/0068345 A1    Mar. 20, 2008

(30) Foreign Application Priority Data

Sep. 15, 2006    (JP) .................................. 2006-251414

(51) Int. Cl.
    *G06F 3/041*    (2006.01)
(52) U.S. Cl. ........................................ 345/173; 715/255
(58) Field of Classification Search .......... 345/173–179; 178/18.09, 18.11, 19.01–19.06, 20.01; 715/863, 715/255, 211, 856
    See application file for complete search history.

(56) References Cited

U.S. PATENT DOCUMENTS

| 7,120,872 | B2 * | 10/2006 | Thacker ........................ 715/209 |
| 7,394,935 | B2 * | 7/2008 | Chen et al. .................... 382/181 |
| 2001/0024193 | A1 * | 9/2001 | Fahraeus ........................ 345/173 |
| 2002/0057263 | A1 * | 5/2002 | Keely et al. .................... 345/179 |
| 2003/0128244 | A1 * | 7/2003 | Iga et al. ........................ 345/863 |
| 2006/0001650 | A1 * | 1/2006 | Robbins et al. ............... 345/173 |

FOREIGN PATENT DOCUMENTS

| JP | 8-30615 | 2/1996 |
| JP | 09-167058 | 6/1997 |
| JP | 2000-285251 | 10/2000 |

OTHER PUBLICATIONS

Official communication issued by Japanese Patent Office, dated May 23, 2011, issued in Japanese Patent Application No. 2006-251414.

* cited by examiner

*Primary Examiner* — Stephen Sherman
(74) *Attorney, Agent, or Firm* — Fitzpatrick, Cella, Harper & Scinto

(57) ABSTRACT

Disclosed is an information processing apparatus for data input in which input and editing can be performed through a simple operation, the apparatus having a coordinate input device and a display device and being operable in a drawing mode and an editing mode. The apparatus includes determination means for determining whether a change in coordinate data has occurred while drawing processing is being executed based upon coordinate data that has been input from the coordinate input device in the drawing mode, and control means for exercising control so as to transition to the editing mode if the determination means has determined that a state in which there is no change in coordinate data has continued for a preset period of time.

8 Claims, 15 Drawing Sheets

1201

1202

1301　　　　　　　　　　1302

INFORMATION PROCESSING APPARATUS AND METHOD OF CONTROLLING SAME

BACKGROUND OF THE INVENTION

1. Field of the Invention

The present invention relates to a technique for controlling the input of data in an information processing apparatus. More particularly, the invention relates to a technique for controlling input using a digitizer.

2. Description of the Related Art

An information processing apparatus for accepting and displaying freehand drawing by a user is available in the prior art. Examples include a tablet display for accepting freehand drawings entered by a pen, and a personal computer for accepting freehand drawings entered by a pointing device such as a mouse. When characters or the like that have been input by freehand drawing are edited in such an information processing apparatus, the editing is performed after changing over the function of the input unit from an input mode to an editing mode.

Further, the specification of Japanese Patent Application Laid-Open No. 8-30615 (Document 1) discloses a technique whereby a mode in which an editing-target area is edited in units is made possible by operating only a pen or mouse. More specifically, by performing a continuous operation such as holding down a pen or mouse at a designated start position, the mode of editing in units is changed over automatically at fixed time intervals. Editing is performed by sensing the beginning of pen drag or mouse drag and selecting the mode prevailing at the moment the start of dragging is sensed.

However, the technique described in Document 1 has certain problems. Specifically, in order to designate the editing-target area, not only is it necessary to select the editing-unit mode but it is also necessary to designate two points, namely the starting and end points of the editing-target area. Further, after the input mode is changed over to the editing mode and the editing-target area is edited, a complicated operation is needed to restore the input mode. In a presentation or the like in which a complicated operation must be avoided, therefore, performing editing is difficult.

SUMMARY OF THE INVENTION

The present invention has been devised in view of the problems mentioned above and its object is to provide a data input technique in which input and editing are made possible by a simpler operation.

According to one aspect of the present invention, an information processing apparatus having a coordinate input device and a display device and being operable in a drawing mode, in which an image is drawn on the display device based upon coordinate data that is input from the coordinate input device, and in an editing mode for editing an image that has been drawn based upon coordinate data that is input from the coordinate input device, the apparatus comprises: a determination unit for determining whether a state in which there is no change in coordinate data has continued for a prescribed period of time in the drawing mode in a state in which drawing processing is being executed based upon the coordinate data that has been input from the coordinate input device; and a control unit for exercising control so as to shift to the editing mode if the determination unit has determined that the state in which there is no change in coordinate data has continued for the prescribed period of time.

According to another aspect of the present invention, a method of controlling an information processing apparatus having a coordinate input device and a display device and being operable in a drawing mode, in which an image is drawn on the display device based upon coordinate data that is input from the coordinate input device, and in an editing mode for editing an image that has been drawn based upon coordinate data that is input from the coordinate input device, the method comprises: a determination step of determining whether a state in which there is no change in coordinate data has continued for a prescribed period of time in the drawing mode in a state in which drawing processing is being executed based upon the coordinate data that has been input from the coordinate input device; and a control step of exercising control so as to shift to the editing mode if it has been determined at the determination step that the state in which there is no change in coordinate data has continued for the prescribed period of time.

In accordance with the present invention, a data input technique in which input and editing are made possible by a simpler operation can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail with reference to the drawings. It should
}

First Embodiment

An information processing apparatus in which a freehand drawing input made by a user using a pen is accepted by a digitizer will be described below as a first embodiment of an information processing apparatus according to the present invention.

<Structure of Apparatus>

Figure 1:
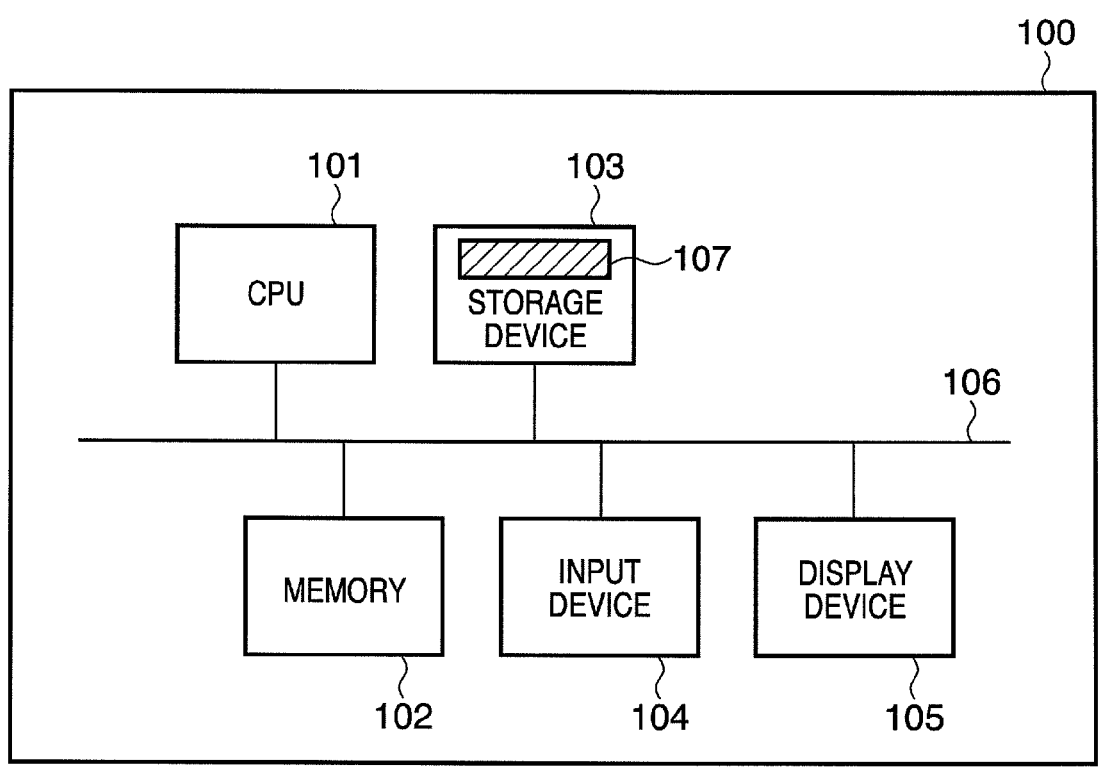
FIG. 1 is a diagram illustrating the internal structure of an information processing apparatus according to a first embodiment of the present invention.

FIG. 1 is a diagram illustrating the internal structure of an information processing apparatus 100 according to a first embodiment. The information processing apparatus 100 includes a CPU 101, a memory 102, a storage device 103, an input device 104 and a display device 105. These are interconnected by a bus 106.

The CPU 101 executes various functions, described below, by running an application program 107 that has been stored in the storage device 103. The memory 102 temporarily stores programs and data that have been read out of the storage device 103 by the CPU 101. The memory 102 is utilized also as an area for the purpose of executing various programs. The storage device 103 stores an operating system, various application programs, a control program and data, etc. Coordinate values, etc., that prevail when a freehand drawing, described below, is input serve as data. It should be noted that the storage device 103 comprises a large-capacity storage device such as a hard-disk drive.

The input device 104 is a functional unit that accepts an input from a user. Specifically, the input device 104 uses a digitizer 104a, a pen 104b, a keyboard 104c and a mouse 104d, etc. The display device 105 displays information that has been input by the input device 104 and the results of executing the application program by the CPU 101.

Figure 2:
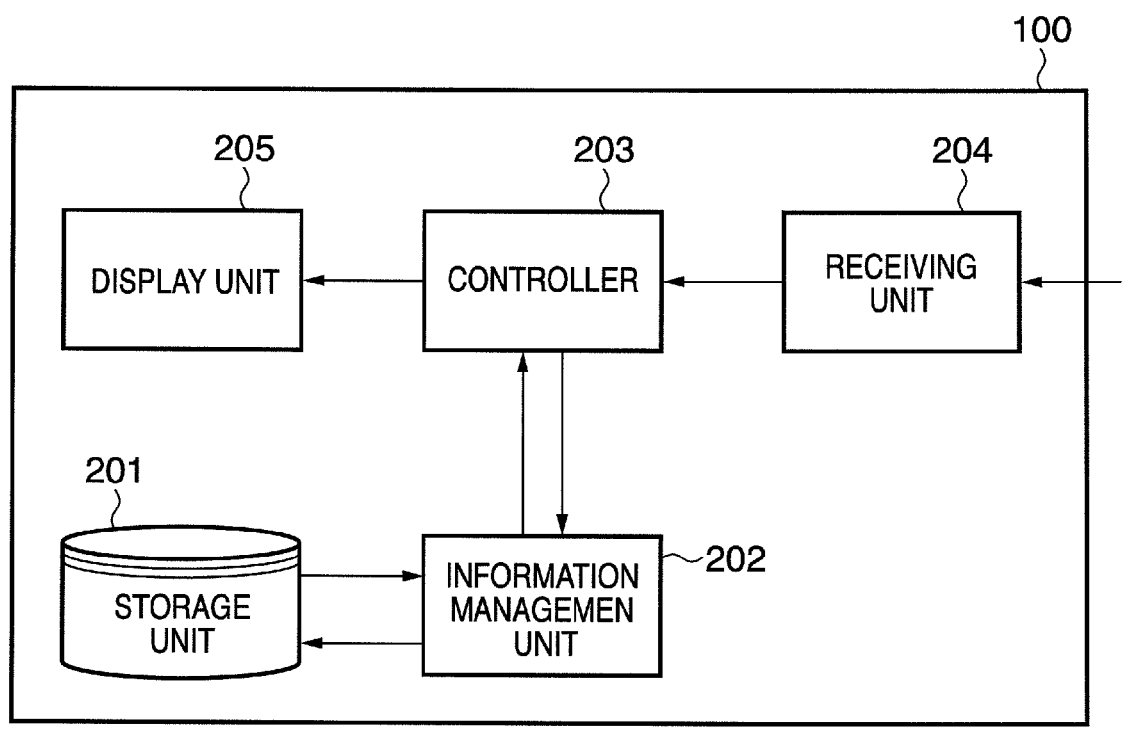
FIG. 2 is a functional block diagram of the information processing apparatus according to the first embodiment.

FIG. 2 is a functional block diagram of the information processing apparatus according to the first embodiment. The information processing apparatus 100 comprises functional units, namely a storage unit 201, an information management unit 202, a controller 203, a receiving unit 204 and a display unit 205.

The storage unit 201 is a functional unit which, in accordance with a request from the information management unit 202 (described later), stores drawing information presently being displayed. Specifically, when the CPU 101 executes the application program 107, the storage unit 201 is acquired in the memory 102 and storage device 103.

The information management unit 202 is a functional unit for manipulating and managing information stored in the storage unit 201. In accordance with a request from the controller 203 (described later), the information management unit 202 operates and manages the storage unit 201. Specifically, the information management unit 202 is implemented by the CPU 101 executing the application program 107.

The controller 203 is a functional unit which, in accordance with information received by the receiving unit 204, controls the execution of various functions possessed by the application program 107. It should be noted that the controller 203 has an internal timer and is capable of measuring various time periods. The receiving unit 204 is a functional unit for receiving input information that the user has entered by the digitizer 104a, etc., and reporting the information to the controller 203. The display unit 205 is a functional unit for displaying the results of executing various functions implemented by the controller 203 based upon information input by the receiving unit 204. Specifically, the display unit 205 comprises the display device 105.

<Operation of Apparatus>

Figure 3:
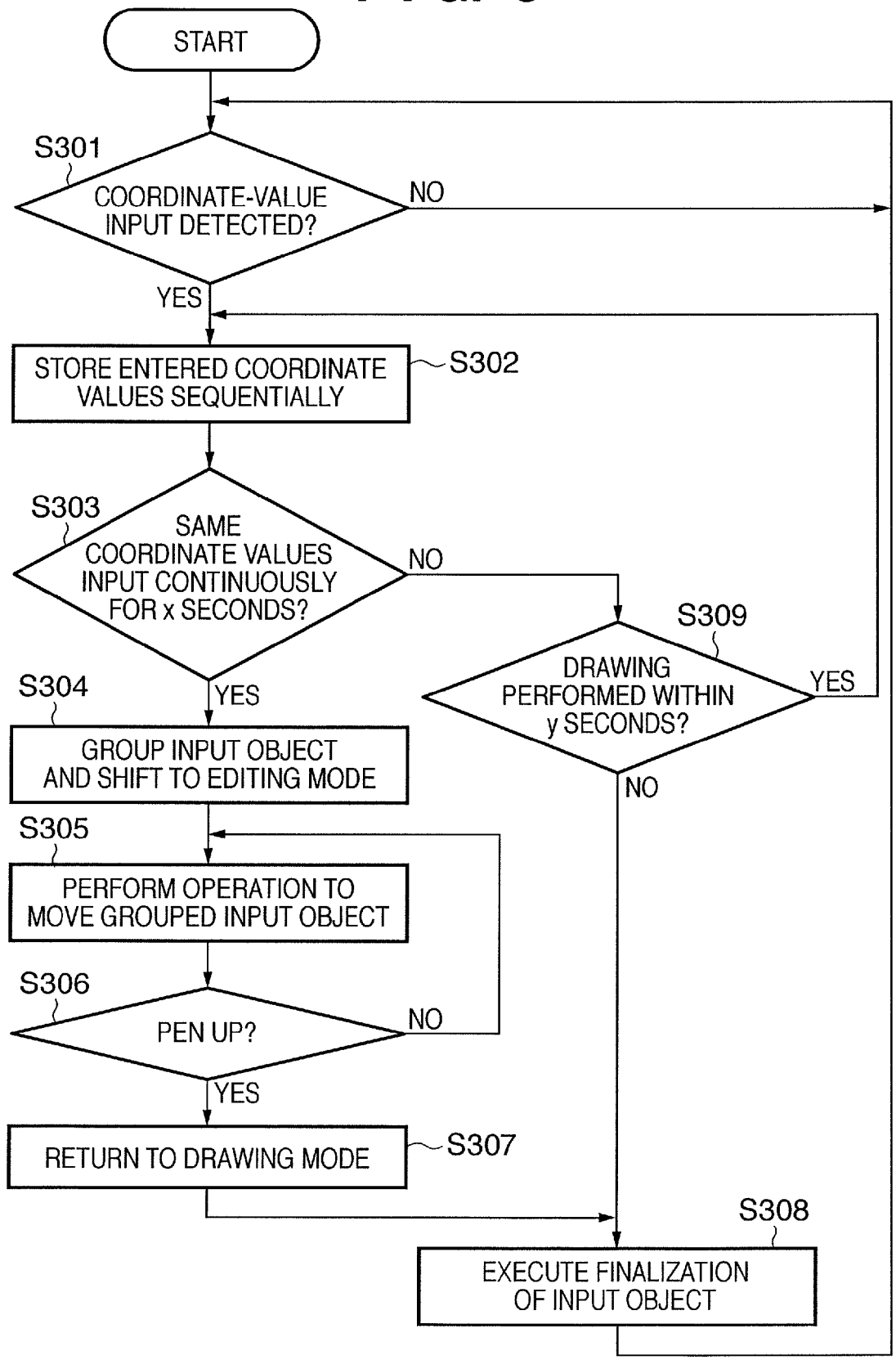
FIG. 3 is a flowchart illustrating operation of the information processing apparatus according to the first embodiment.

FIG. 3 is a flowchart illustrating operation of the information processing apparatus according to the first embodiment. In particular, the illustrated operation flowchart is that of processing executed when the information processing apparatus 100 is operating in the drawing mode and the user manipulates the pen 104b to input a freehand drawing by the digitizer 104a. Processing will be described below while referring to examples (FIGS. 4 to 8) of display screens at each of the steps of the flow of operation. Although expressions such as "ABCDE" are used in the description that follows, in actuality these mean that character shapes are drawn as images by successive inputs of coordinate values.

Further, in the description that follows, a case where the digitizer 104a and pen 104b (also referred to as a stylus) primarily are used as the input device 104 will be described. However, a pointing device such as the mouse 104d capable of inputting coordinates will suffice. It will be assumed that the digitizer 104a outputs coordinate values to the receiving unit 204 periodically. The coordinate values correspond to a point at which the pen is pressed down upon the digitizer (also referred to as "pen down" below). In other words, in a case where the digitizer 104a is not being pressed down by the pen 104b (also referred to as "pen up" below), a coordinate-value signal is not output to the receiving unit 204.

At step S301 in FIG. 3, the controller 203 determines whether input of coordinate values to the receiving unit 204 by the digitizer 104a has started. Specifically, the controller 203 detects input of coordinate values to the receiving unit 204 by the pen-down operation of the pen 104b on the digitizer 104a by the user. If such an input is detected, control proceeds to step S302. If input is not detected, then step S301 is repeated until an input is detected.

At step S302, the controller 203 stores the coordinate-value information, which has been input to the receiving unit 204, in the storage unit 201 sequentially via the information management unit 202.

Next, at step S303, the controller 203 determines whether the pen 104b has been at rest on the digitizer 104a in the pen-down state for more than a prescribed period of time (x seconds). Specifically, the controller 203 determines whether input of the same coordinate values to the receiving unit 204 has been performed for a prescribed period of time. In order to allow for some shaking of the user's hand, a setting may be made so as to allow for a certain amount of fluctuation in the coordinate values. If it is determined that the pen has been at rest for the prescribed period of time, control proceeds to step S304. On the other hand, if it is determined that the pen 104b has been moved or raised from the digitizer before this period of time elapses, control proceeds to step S309.

Figure 4:
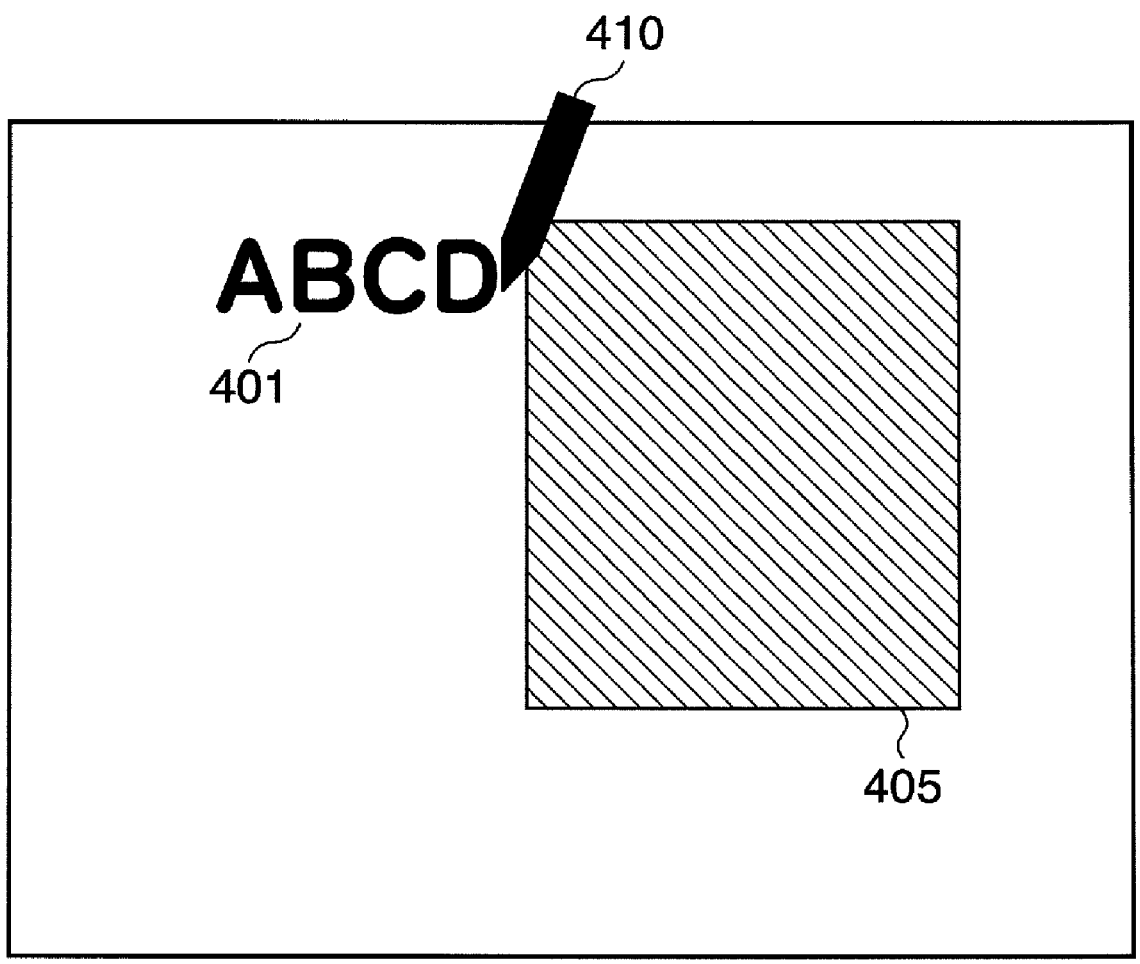
FIG. 4 is a diagram exemplifying a state in which a freehand drawing is input (S303)

FIG. 4 is a diagram exemplifying a state in which a freehand drawing is input by the user using the pen 104b. In particular, the state illustrated is one in which an attempt to write "ABCDE" by a pen 410 has been made but the final "E" cannot be written to the right of "D" owing to an already existing input object 405. The user is capable of recognizing that there is an empty space to the left of "A" and that an area for allowing input of "E" can be acquired by moving "ABCD", which is an input object 401, to the left. Accordingly, the user holds the pen 104b down upon the digitizer 104a at the last character "D". This serves as a trigger to proceed to step S304.

At step S309, the controller 203 determines whether pen-up has continued for a prescribed period of time (y seconds).

If pen-up has continued for the prescribed period of time, control proceeds to step S308. On the other hand, if pen-up ends in less than the prescribed period of time and coordinates are input anew, then control returns to step S302 and input continues.

At step S304, the controller 203 exercises control (grouping) in such a manner that the drawing-related information such as coordinates stored in the storage unit 201 from steps S301 to S303 is handled as one group. The information processing apparatus 100 is changed over to the editing mode with the grouped information in the selected state.

Figure 5:
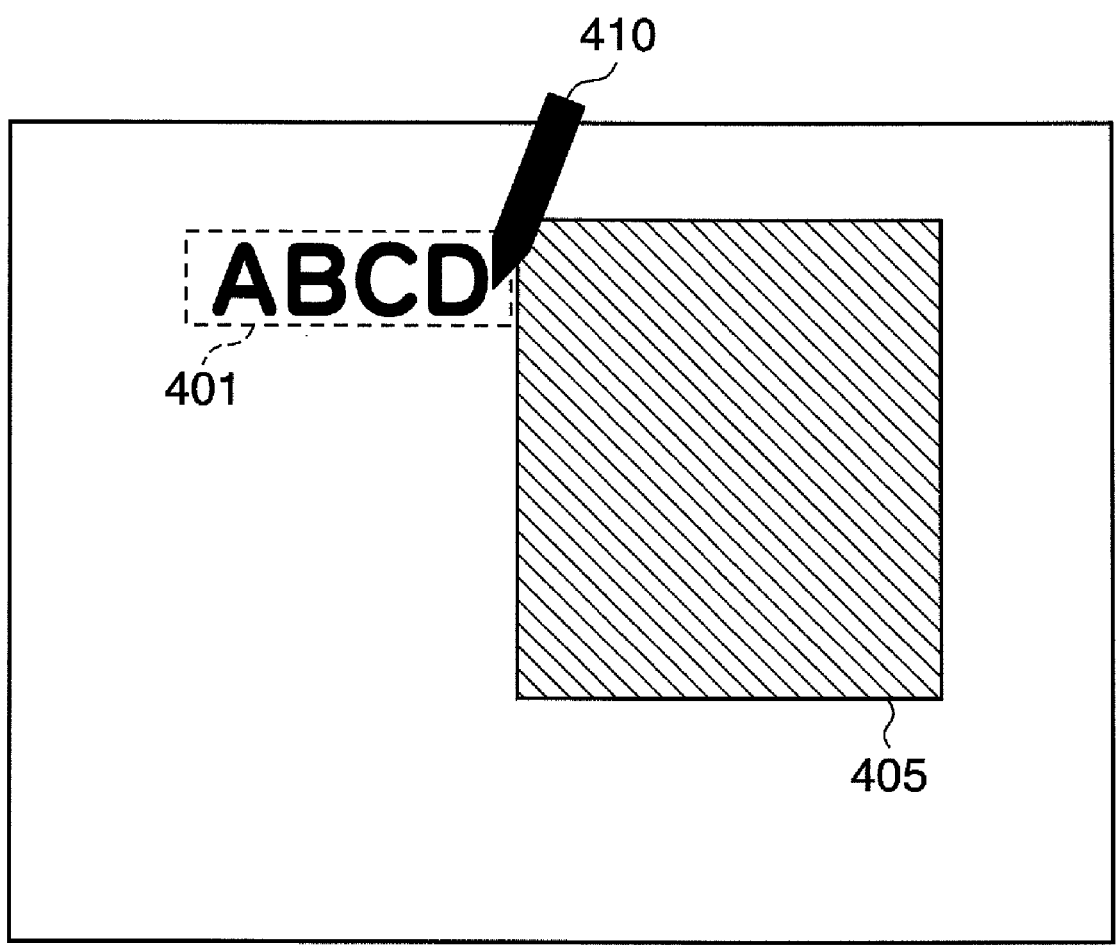
FIG. 5 is a diagram exemplifying a state in which a freehand drawing is input (S304)

FIG. 5 is a diagram exemplifying a state in which the user holds the pen 104b at rest and groups the freehand-drawing input object 401. This illustrates the result of maintaining the at-rest condition for the prescribed period of time with the pen or mouse held down in the state shown in FIG. 4. The input object "ABCD" drawn successively from steps S301 to S303 is grouped. The changeover to the editing mode is made with the grouped "ABCD" in the selected state.

Next, at step S305, the controller 203 moves the object, which is in the selected state, based upon movement of the pen 104b on the digitizer 104a by the user. The moving state of the pen 104b is received while the pen-down state of the pen 104b continues. In other words, the grouped input object "ABCD" is moved in conformity with movement of the pen 104b.

Figure 6:
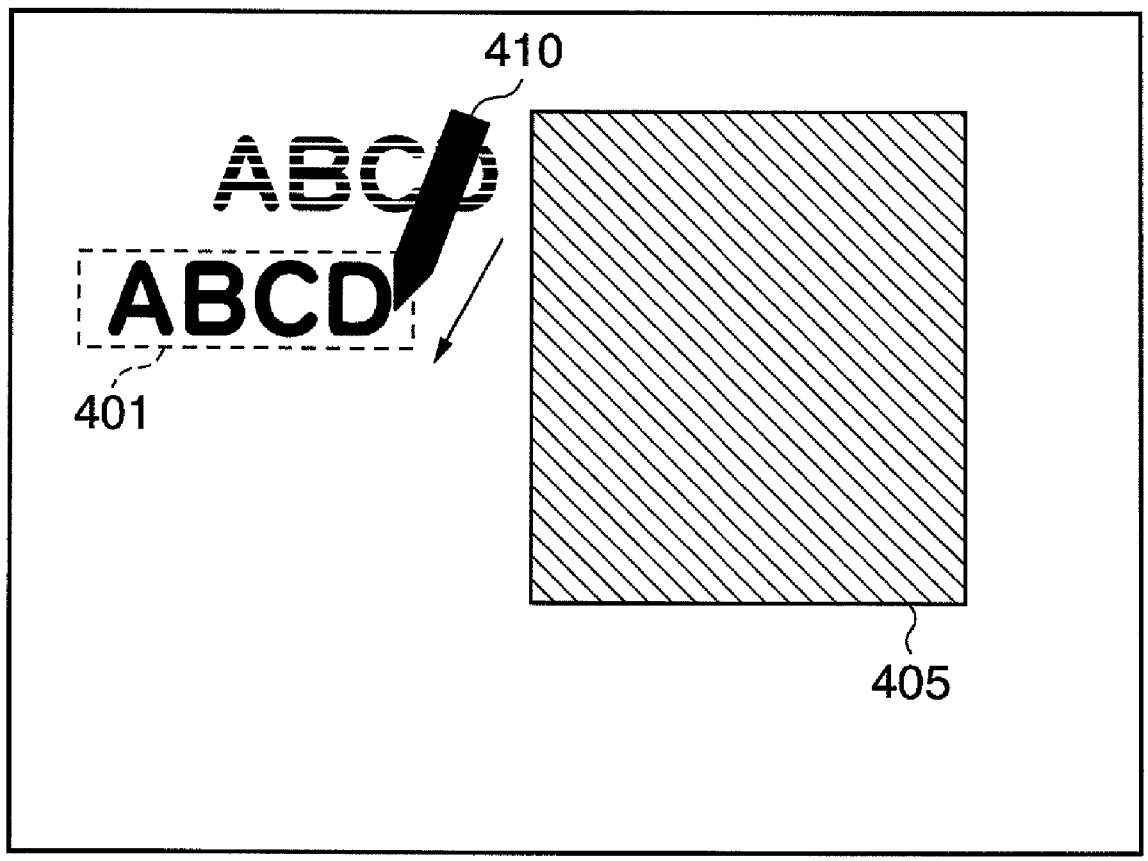
FIG. 6 is a diagram exemplifying a state in which a freehand drawing is input (S305)

FIG. 6 is a diagram exemplifying a state in which the user moves the pen 104b to move the selected object. Since the information processing apparatus 100 is in the editing mode, the movement of the pen 104b in the pen-down state (which is equivalent to a dragging operation by a mouse) is reflected in the movement of the grouped input object 401 on the screen.

At step S306, the controller 203 determines whether the pen 104b has been raised (i.e., whether the pen-down state as ended). If pen-up has been determined, control proceeds to step S307. In other words, the controller 203 determines whether movement of the selected object by the user has been completed. If pen-up has not been determined, on the other hand, steps S305 and S306 are repeated until pen-up is determined.

At step S307, the controller 203 de-selects the object that was grouped at step S304 and returns the information processing apparatus 100 to the drawing mode.

Figure 7:
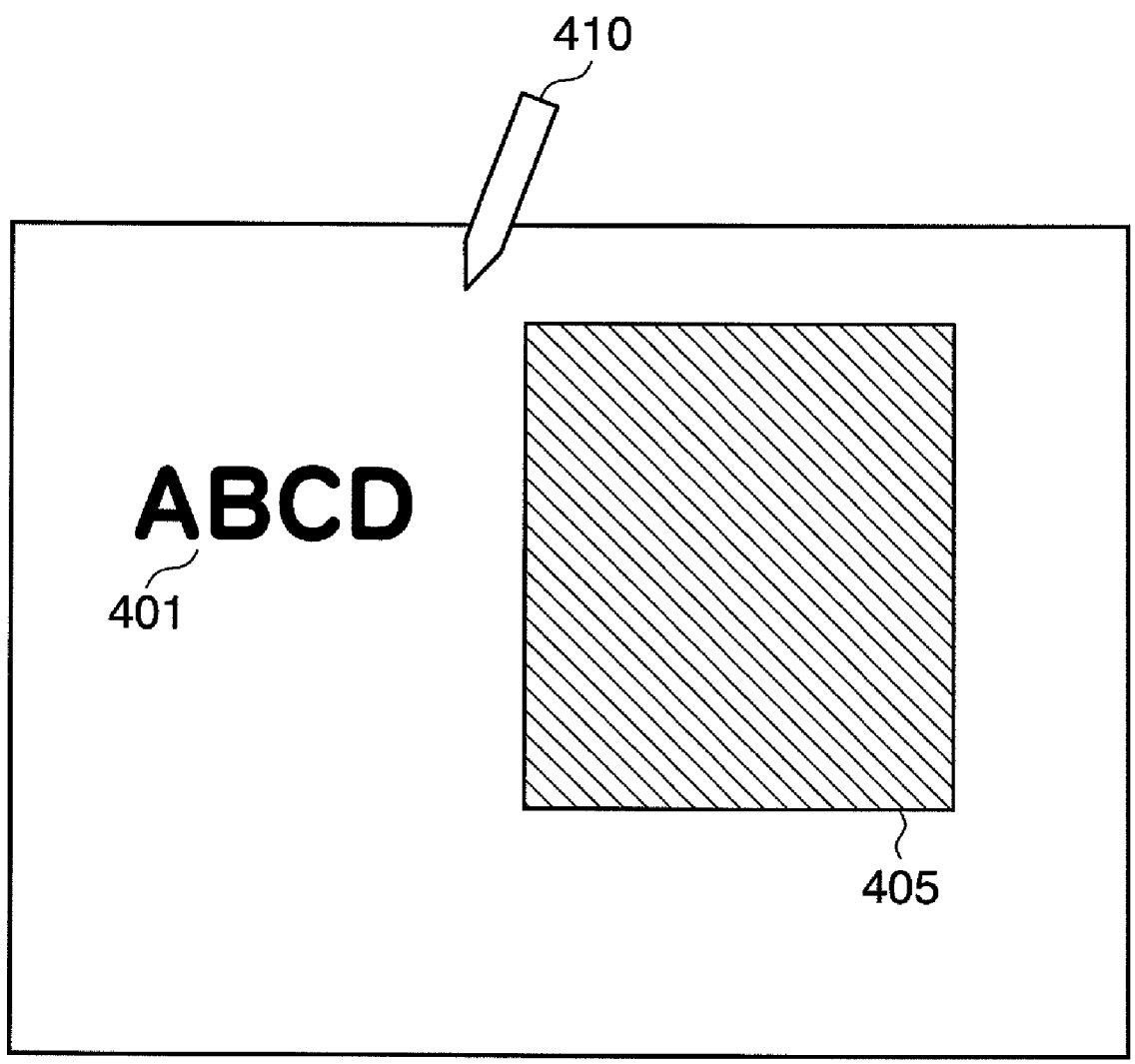
FIG. 7 is a diagram exemplifying a state in which a freehand drawing is input (S306)

FIG. 7 is a diagram exemplifying a state in which the user raises the pen 104b and completes moving of the selected input object 401. This illustrates a state in which the pen 104b has been raised at a position occupied by the pen 104b following movement of the pen 104b in FIG. 6. It may be so arranged that the objected grouped at step S304 is de-grouped at this time.

At step S308, the controller 203 finalizes the input object in the state prevailing at step S307 or S309. Specifically, the information that has been stored in the storage unit 201 is post-processed, such as by setting it as information of a new existing object, and the information stored in the storage unit 201 is discarded. Control then returns to step S301 and the start of new drawing is received.

Figure 8:
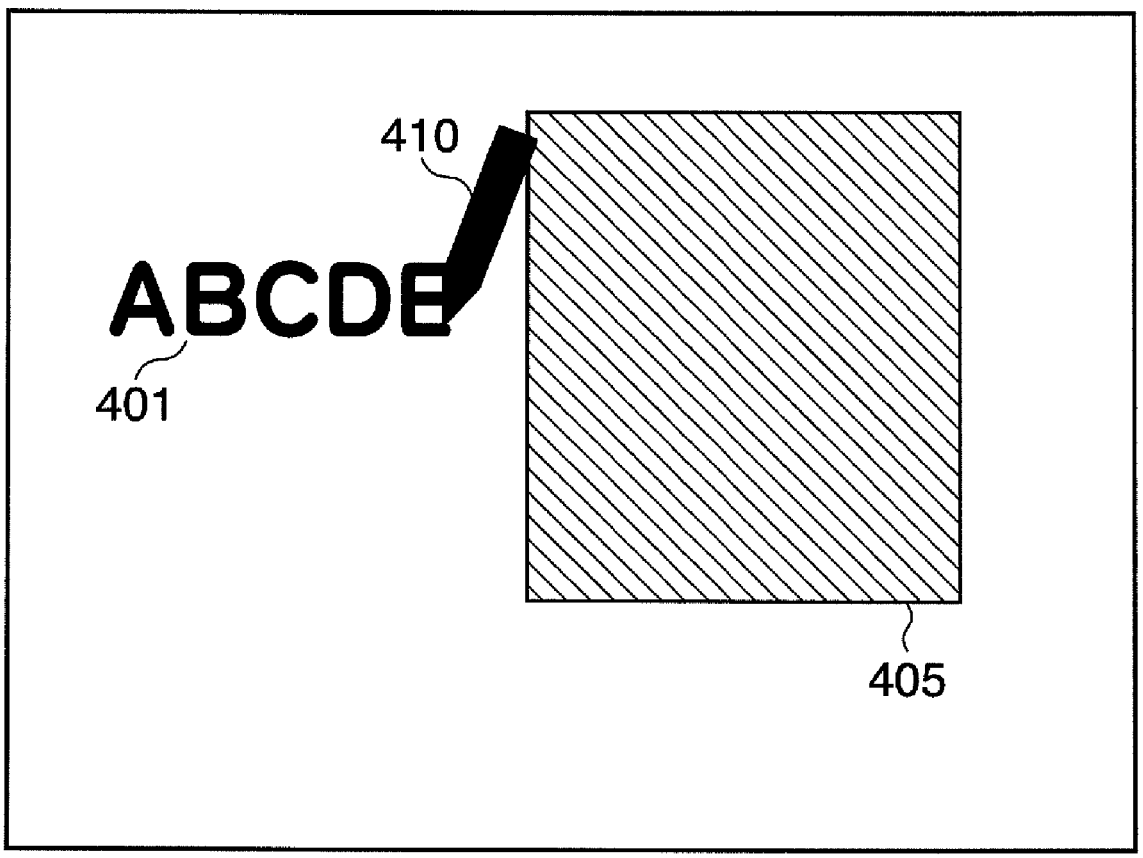
FIG. 8 is a diagram exemplifying a state in which a freehand drawing is input (S308)

FIG. 8 is a diagram exemplifying a state in which the drawing mode is restored and input by a user starts again. A plurality of freehand-drawing input objects can be entered by repeating the flow illustrated in FIG. 3.

In accordance with the information processing apparatus 100 according to the first embodiment, as described above, by a simple operation performed by the user using the pen 104b, a transition can be made to an editing-area designating and editing mode and the drawing mode can be restored from the editing mode. Therefore, at any timing during drawing by a pen such as at the time of a presentation, it is possible to edit content that is in the process of being drawn. For example, when the user has determined that enough space for drawing is about to run out during drawing, a move operation can be performed.

In the first embodiment, it is so arranged that an input is grouped by stopping movement of a pen, and an operation for moving a grouped object is accepted. However, an arrangement in which another operation such as an enlarging or reducing operation applied to a grouped object is accepted may be adopted.

Second Embodiment

Overview

A second embodiment will be described with regard to an example in which the operation of the first embodiment is supplemented by an operation in which it is possible to accept a further input of a freehand drawing applied to a grouped object after the grouped object has been moved. In other words, in the first embodiment, the arrangement in such that after a grouped object is moved, finalization processing is executed automatically. Consequently, an input made after finalization is handled as an object entirely separate from the finalized object.

Accordingly, in the second embodiment, the arrangement adopted is such that an object that is input after movement of a grouped object is capable of being handled as an object that is an integral part of the grouped objected. It should be noted that since the structure of the information processing apparatus is similar to that of the first embodiment, the structure need not be described again.

<Operation of Apparatus>

Figure 9:
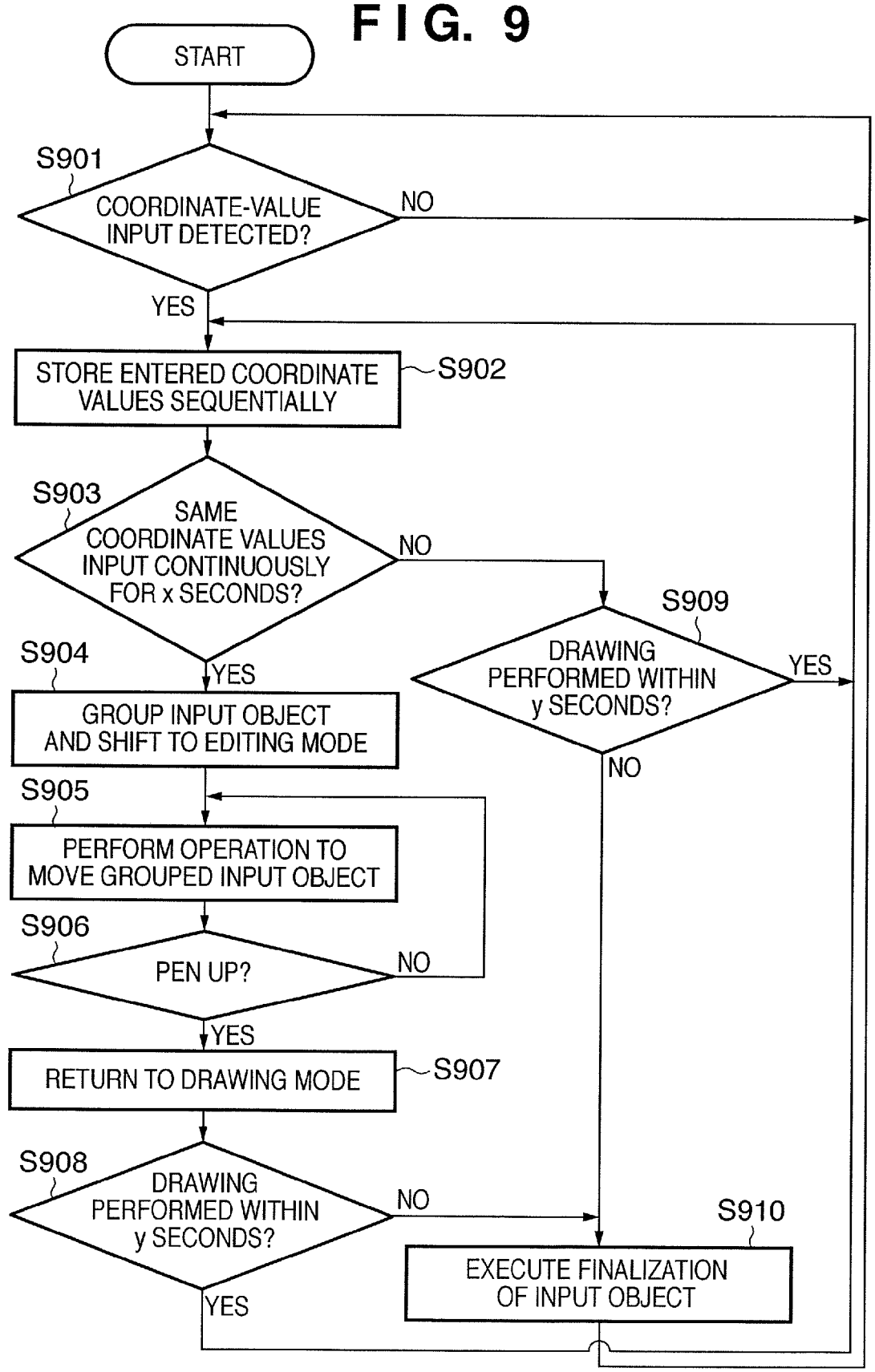
FIG. 9 is a flowchart illustrating operation of the information processing apparatus according to the second embodiment of the present invention.

FIG. 9 is a flowchart illustrating operation of the information processing apparatus according to the second embodiment. This embodiment differs from the first embodiment in that when the drawing mode is restored from the editing mode, the object finalizing operation is not performed and input processing is executed continuously as long as the input operation continues.

At step S901 in FIG. 9, the controller 203 determines whether input of coordinate values to the receiving unit 204 by the digitizer 104a has started. Specifically, the controller 203 detects input of coordinate values to the receiving unit 204 by the pen-down operation of the pen 104b on the digitizer 104a by the user. If such an input is detected, control proceeds to step S902. If input is not detected, then step S901 is repeated until an input is detected.

At step S902, the controller 203 stores the coordinate-value information, which has been input to the receiving unit 204, in the storage unit 201 sequentially via the information management unit 202.

Next, at step S903, the controller 203 determines whether the pen 104b has been at rest on the digitizer 104a in the pen-down state for more than a prescribed period of time (x seconds). Specifically, the controller 203 determines whether input of the same coordinate values to the receiving unit 204 has been performed for a prescribed period of time. In order to allow for some shaking of the user's hand, a setting may be made so as to allow for a certain amount of fluctuation in the coordinate values. If it is determined that the pen has been at rest for the prescribed period of time, control proceeds to step S904. On the other hand, if it is determined that the pen 104b has been moved or raised from the digitizer before this period of time elapses, control proceeds to step S909.

At step S909, the controller 203 determines whether pen-up has continued for a prescribed period of time (y seconds). If pen-up has continued for the prescribed period of time, control proceeds to step S910. On the other hand, if pen-up ends in less than the prescribed period of time and coordinates are input anew, then control returns to step S902 and input continues.

At step S904, the controller 203 exercises control (grouping) in such a manner that the drawing-related information such as coordinates stored in the storage unit 201 from steps S901 to S903 is handled as one group. The information processing apparatus 100 is changed over to the editing mode with the grouped information in the selected state.

Next, at step S905, the controller 203 moves the object, which is in the selected state, based upon movement of the pen 104b on the digitizer 104a by the user. The moving state of the pen 104b is received while the pen-down state of the pen 104b continues. In other words, the grouped input object "ABCD" is moved in conformity with movement of the pen 104b.

At step S906, the controller 203 determines whether the pen 104b has been raised (i.e., whether the pen-down state as ended). If pen-up has been determined, control proceeds to step S907. In other words, the controller 203 determines whether movement of the selected object by the user has been completed. If pen-up has not been determined, on the other hand, steps S905 and S906 are repeated until pen-up is determined.

At step S907, the controller 203 de-selects the object that was grouped at step S904 and returns the information processing apparatus 100 to the drawing mode.

At step S908, the controller 203 determines whether a prescribed period of time (y seconds) has elapsed since restoration of the drawing mode. Control proceeds to step S910 if this period of time has elapsed. On the other hand, if coordinates are input anew before the prescribed period of time (y seconds) elapses, then control returns to step S902 and input continues.

At step S910, the controller 203 finalizes the input object in the state prevailing at step S907 or S909. Specifically, the information that has been stored in the storage unit 201 is post-processed, such as by setting it as information of a new existing object, and the information stored in the storage unit 201 is discarded. Control then returns to step S901 and the start of new drawing is received.

Figure 10:
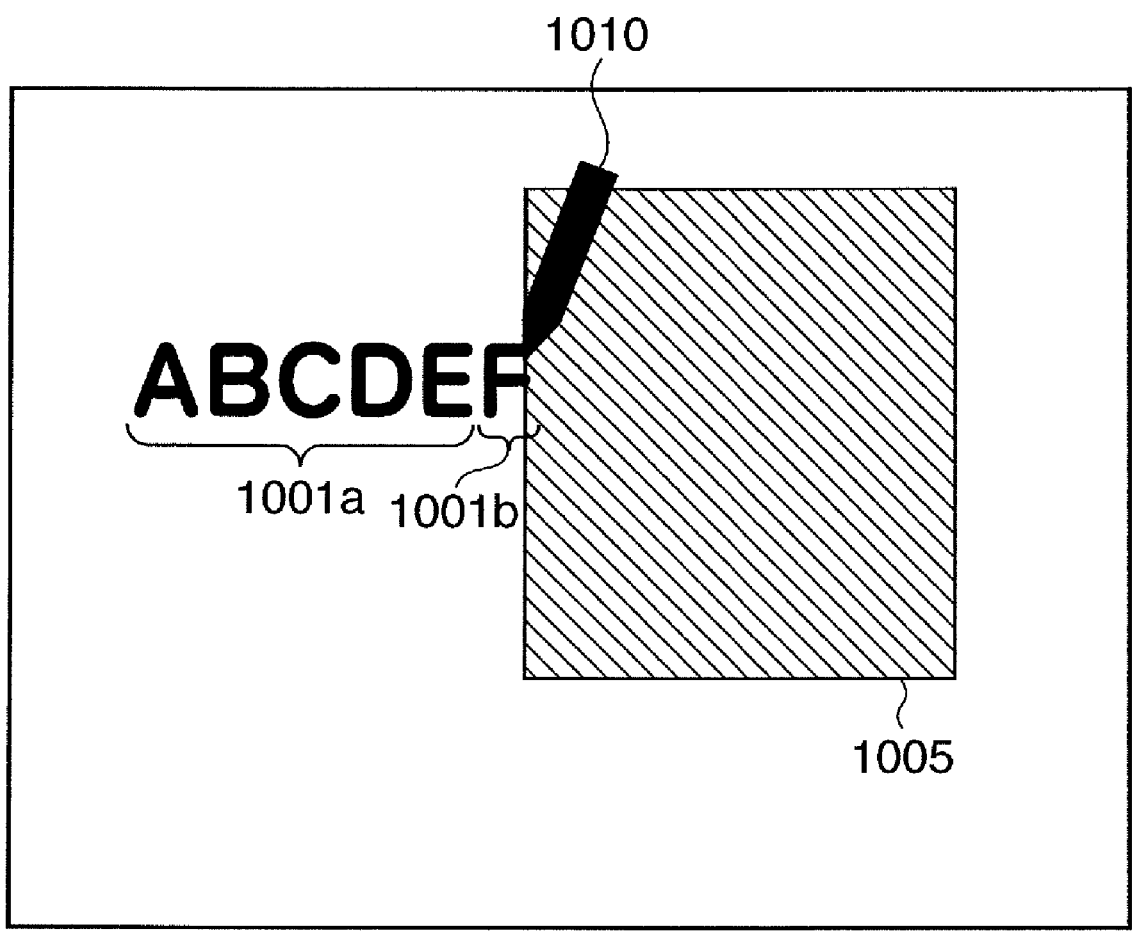
FIG. 10 is a diagram exemplifying a state in which a character is appended by freehand drawing after editing.
Figure 11:
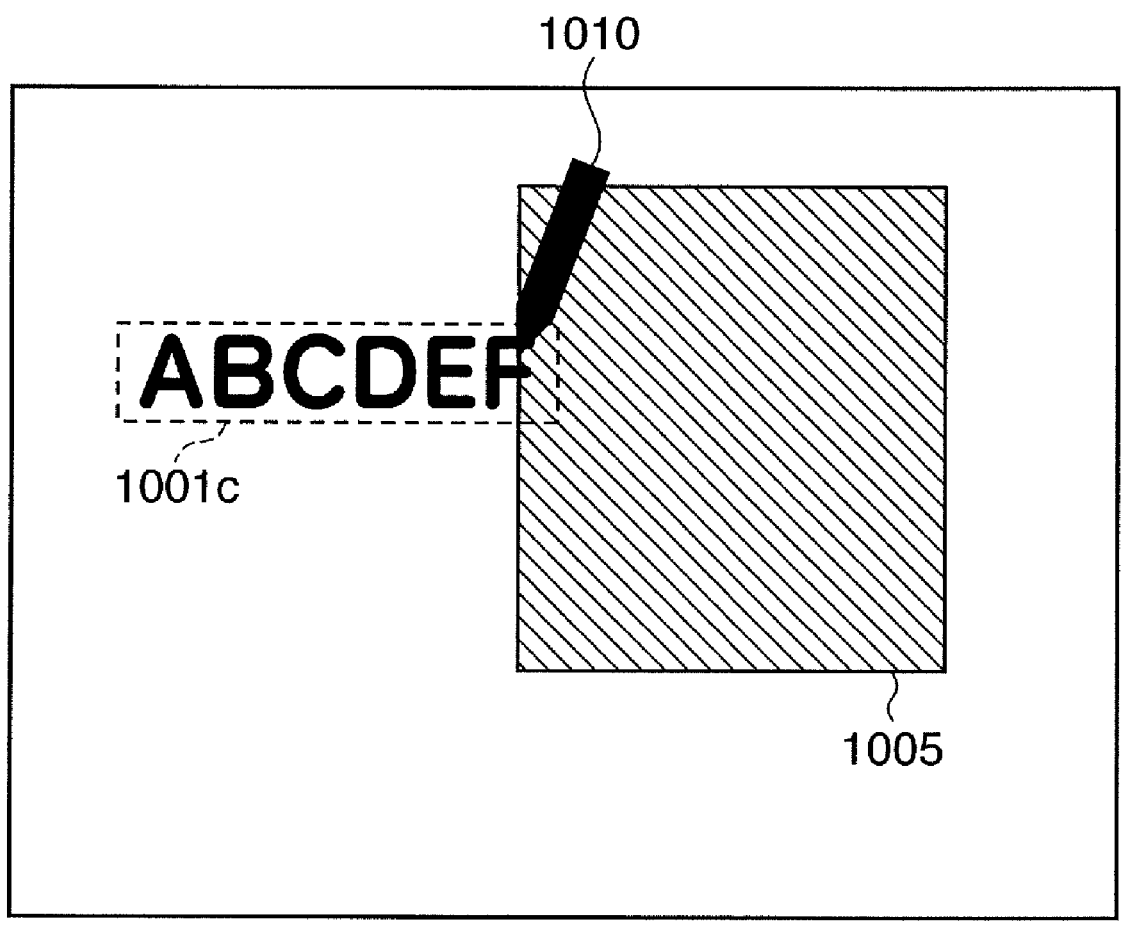
FIG. 11 is a diagram exemplifying a state in which the appended input is grouped and moved.

FIG. 10 is a diagram exemplifying a state in which the drawing of an input object 100b, namely the character "F", is appended by freehand drawing to an input object 1001a, namely "ABCDE", which was moved in the editing mode. In a case where it is desired to move the input object further from the state illustrated, the pen need only be pressed down again and held at rest at the final character "F". If this is done, then the characters will be grouped as "ABCDE" and can be moved, as illustrated in FIG. 11.

In accordance with the information processing apparatus 100 according to the second embodiment, as described above, the functions of the first embodiment are supplemented by the ability to exercise control so as to add to an object that has been moved in the editing mode.

(Modification)

Figure 12:
FIG. 12 is a diagram exemplifying a state in which unintentional grouping can occur.
Figure 12:

In the second embodiment, content drawn immediately after editing is grouped with content that was written before editing. In this case, however, there are instances where unintentional grouping takes place. For example, as illustrated in FIG. 12, grouping takes place even in a case where the user draws the object 1201, namely "ABCD", before editing and subsequently draws object 1202, namely "EF", at a distant location intentionally. In other words, the objects 1201 and 1202 cannot be editing separately.

Accordingly, an arrangement may be adopted in which two input objects are grouped together only in a case where a freehand-drawing input object (one object) after restoration from the editing mode has been drawn within an area that is a prescribed distance from the position of an input object (another input object) that was the target of editing previously. This makes it possible to reduce unintentional grouping.

Figure 13:
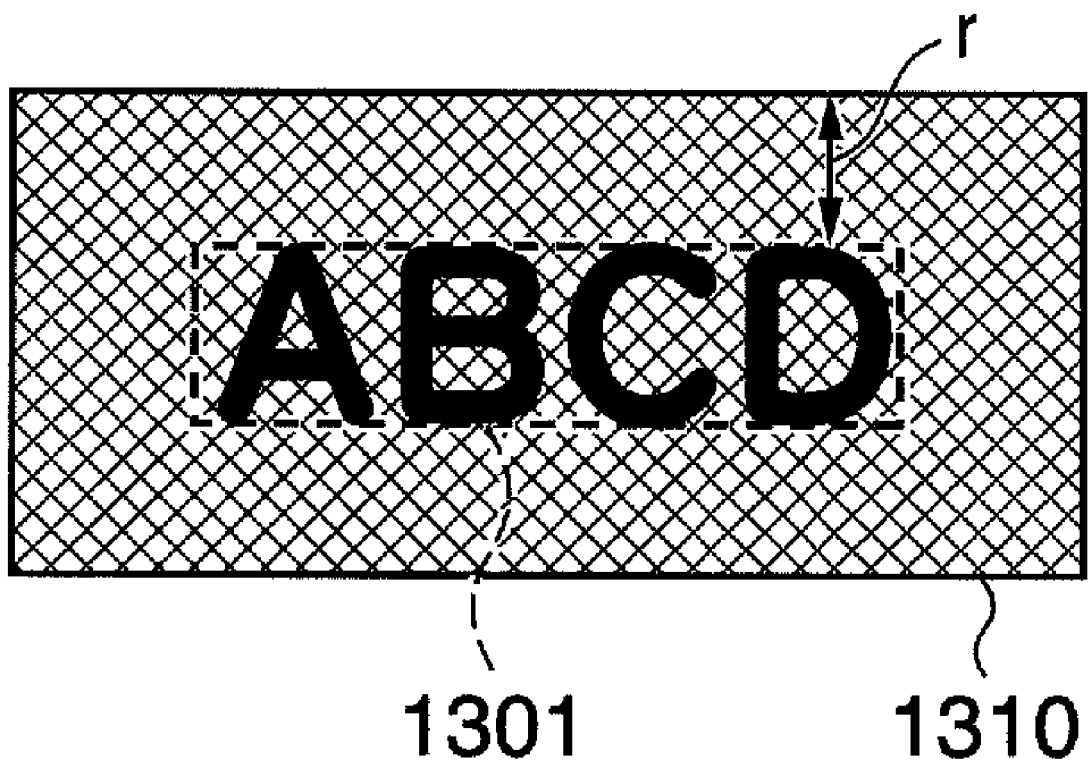
FIG. 13 is a diagram illustrating an example of an input object immediately after editing.
Figure 14A:
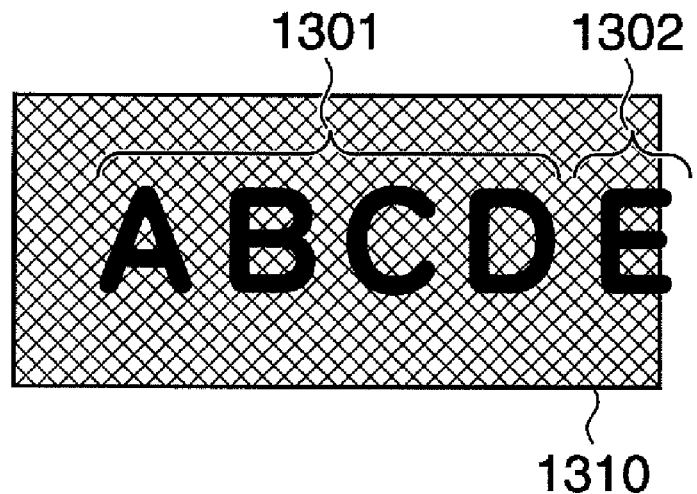
FIGS. 14A and 14B are diagrams exemplifying a method of deciding grouping of an appended input object.
Figure 14B:
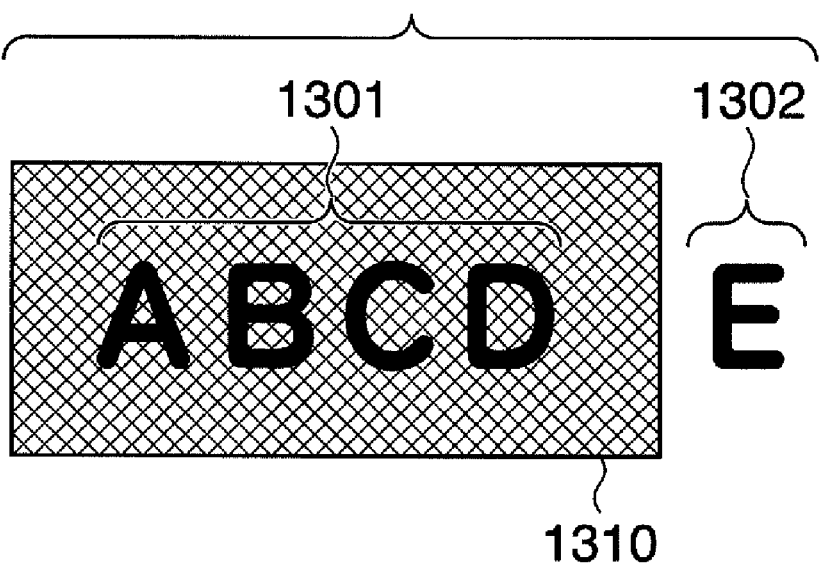

FIG. 13 is a diagram illustrating an example of an input object immediately after editing. As shown in FIG. 13, a region 1310 indicated by hatching within area at a distance r from an input object 1301 is set. When a freehand drawing is made within the region 1310 in this state, as illustrated in FIG. 14A, input objects 1301 and 1302 before and after editing are grouped. On the other hand, when a freehand drawing is made outside the region 1310, as illustrated in FIG. 14B, the input objects 1301 and 1302 before and after editing are set as separate objects.

Figure 15:
FIG. 15 is a diagram illustrating another example of a method of deciding grouping.

Further, it may be so arranged that grouping is performed when the input object 1302 is written so as to overlap the input object 1301. This corresponds to a case where r of region 1310 in FIG. 13 is made as small as possible. FIG. 15 is a diagram exemplifying the input object 1301 before editing and the input object 1302 appended by being superimposed upon the input object 1301 after editing.

Other Embodiments

Although embodiments of the present invention have been described above in detail, the present invention may be applied to a system constituted by a plurality of devices or to an apparatus comprising a single device.

Furthermore, the invention is attained also by supplying a program, which implements the functions of the foregoing embodiments, directly or remotely to a system or apparatus, reading the supplied program codes by the system or apparatus, and then executing the program codes. Accordingly, since the functional processing of the present invention is implemented by computer, the computer program per se installed on the computer falls within the technical scope of the present invention.

In this case, so long as the system or apparatus has the functions of the program, the form of the program, e.g., object code, a program executed by an interpreter or script data supplied to an operating system, etc., does not matter.

Examples of recording media that can be used for supplying the program are a floppy (registered trademark) disk, hard disk, optical disk (CD, DVD), magneto-optical disk, magnetic tape, non-volatile type memory card and ROM, etc.

Further, the above-described functions of the embodiments are implemented by a computer executing a read program. In addition, an operating system or the like running on the computer can perform all or a part of the actual processing based upon the instructions of the program so that the functions of the foregoing embodiments can be implemented by this processing.

Furthermore, the program code read from a recording medium is written to a memory provided on a function expansion board inserted into the computer or provided in a function expansion unit connected to the computer. Thereafter, a CPU or the like provided on the function expansion board or function expansion unit performs a part of or the entire actual process based upon the instructions of the program, and the functions of the above embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-251414, filed Sep. 15, 2006, which is hereby incorporated by reference herein in its entirety.

What is claimed is:

1. An information processing apparatus having a coordinate input device and a display device and being operable in a drawing mode, in which an image is drawn on the display device based upon coordinate data that is input from the coordinate input device, and in an editing mode for moving the image that has been drawn based upon coordinate data that is input from the coordinate input device, the information processing apparatus comprising:
   a determination unit that determines if the coordinate data input from the coordinate input device has not changed for a prescribed time period; and
   a switching unit that, in a case where the determination unit determines that the coordinate data input from the coordinate input device has not changed for the prescribed time period while in the drawing mode, executes a first processing for switching from the drawing mode to the editing mode, and in a case where the coordinate data input from the coordinate input device is not detected after switching from the drawing mode to the editing mode by the first processing, executes a second processing for switching from the editing mode to the drawing mode; and
   a control unit that performs control, in a case where a first plurality of coordinate data is input from the coordinate input device in the drawing mode during a first time period and a second plurality of coordinate data is input from the coordinate input device in the drawing mode during a second time period, later than the first time period, so that the image, which is based upon the first and second plurality of coordinate data, is moved according to coordinate data input from the coordinate input device in the editing mode during a third time period later than the second time period,
   wherein the switching unit executes the first processing at the end of the first time period and the second processing at the beginning of the second time period.

2. The apparatus according to claim 1, wherein the control unit controls so that the image based upon the first plurality of coordinate data that is input from the coordinate input device during the first time period is moved based upon the coordinate data input from the coordinate input device in the editing mode during a time period between the first and second time period.

3. The apparatus according to claim 1, wherein the coordinate input device outputs coordinate data of a coordinate-input indication unit, which indicates coordinates on an operation surface, and data indicating ON/OFF of a switch provided within the coordinate-input indication unit; and
   the determination unit determines whether there has been a change in the coordinate data in response to the switch being turned ON.

4. The apparatus according to claim 3, wherein the coordinate input device has a coordinate input board and a switch for designating a point on the coordinate input board and detecting pressure applied to the coordinate input board.

5. The apparatus according to claim 1, wherein
   the determination unit determines whether a change amount of the coordinate data input from the coordinate input device for the prescribed time period is smaller than a prescribed amount, and
   the switching unit switches to the editing mode for moving the image in a case where the determination unit determines that the change amount of the coordinate data input from the coordinate input device for the prescribed time period is smaller than the prescribed amount.

6. A method of controlling an information processing apparatus having a coordinate input device and a display device and being operable in a drawing mode, in which an image is drawn on the display device based upon coordinate data that is input from the coordinate input device, and in an editing mode for moving the image that has been drawn based upon coordinate data that is input from the coordinate input device, the method comprising:
   a determination step of determining if the coordinate data input from the coordinate input device has not changed for a prescribed time period;
   a switching step of, in a case where it is determined in the determination step that the coordinate data input from the coordinate input device has not changed for the prescribed time period while in the drawing mode, executing a first processing for switching from the drawing mode to the editing mode and in a case where the coordinate data input from the coordinate input device is not detected after switching from the drawing mode to the editing mode by the first processing, executing a second processing for switching from the editing mode to the drawing mode; and
   a control step of controlling, in a case where a first plurality of coordinate data is input from the coordinate input device in the drawing mode during a first time period and a second plurality of coordinate data is input from the coordinate input device in the drawing mode during a second time period later than the first time period, so that the image, which is based upon the first and second plurality of coordinate data, is moved according to the coordinate data input from the coordinate input device in the editing mode during a third time period later than the second time period,
   wherein the first processing is executed at the end of the first time period and the second processing is executed at the beginning of the second time period, and
   wherein the determination step, the switching step, and the control step are implemented in a central processing unit.

7. A program for causing the method of controlling the information processing apparatus set forth in claim 6 to be executed by a computer, said program being stored on a non-transitory computer-readable storage medium.

8. The method according to claim 6, wherein
   the determination step determines whether a change amount of the coordinate data input from the coordinate input device for the prescribed time period is smaller than a prescribed amount, and
   the switching step switches to the editing mode for moving the image in a case where it is determined that the change amount of the coordinate data input from the coordinate input device for the prescribed time period is smaller than a prescribed amount by the determination step.

* * * * *